United States Patent
Thakur et al.

(10) Patent No.: US 11,025,783 B2
(45) Date of Patent: Jun. 1, 2021

(54) METHODS, SYSTEMS, AND COMPUTER READABLE MEDIA FOR EXTENDING NEW RADIO (NR) USAGE INDICATIONS TO APPLICATION FUNCTION (AF)

(71) Applicant: Oracle International Corporation, Redwood Shores, CA (US)

(72) Inventors: Raghuvamshi vasudev Singh Thakur, Bangalore (IN); Venkatesh Aravamudhan, Bangalore (IN); Sathish Kumar Prabhakaran, Bangalore (IN); Tarek Assali, Wellesley, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/546,223

(22) Filed: Aug. 20, 2019

(65) Prior Publication Data

US 2021/0058518 A1 Feb. 25, 2021

(51) Int. Cl.
*H04W 4/00* (2018.01)
*H04M 15/00* (2006.01)
(Continued)

(52) U.S. Cl.
CPC .......... *H04M 15/66* (2013.01); *H04W 12/06* (2013.01); *H04W 48/16* (2013.01); *H04W 80/12* (2013.01)

(58) Field of Classification Search
CPC ..... H04W 12/06; H04W 48/16; H04W 80/12; H04L 5/00; H04L 5/001; H04L 12/813;
(Continued)

(56) References Cited

U.S. PATENT DOCUMENTS

| 2012/0314632 A1 | 12/2012 | Martinez De La Cruz et al. |
| 2017/0019750 A1* | 1/2017 | Palanisamy ............. H04W 4/70 |

(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 16)," 3GPP TS 23.401, V16.3.0, pp. 1-423 (Jun. 2019).

(Continued)

*Primary Examiner* — Abdelnabi O Musa
(74) *Attorney, Agent, or Firm* — Jenkins, Wilson, Taylor & Hunt, P.A.

(57) ABSTRACT

A method for extending new radio (NR) usage indications to an application function (AF) includes, at a policy and charging rules function (PCRF) including at least one processor, receiving an indication of NR usage by a user equipment (UE). The steps further include determining that an AF is subscribed to receive indications of NR usage for the UE. The steps further include, in response to determining that an AF is subscribed to receive indications of NR usage for the UE, communicating the indication of NR usage to the AF. The steps further include receiving a message from the AF to effect a change in service provided to the UE based on the indication of NR usage. The steps further include effecting the change in service provided to the UE based on the indication of NR usage.

18 Claims, 5 Drawing Sheets

(51) Int. Cl.
*H04W 80/12* (2009.01)
*H04W 12/06* (2021.01)
*H04W 48/16* (2009.01)

(58) Field of Classification Search
CPC ........ H04L 12/24; H04L 46/16; H04M 15/66; H04M 15/64; H04M 15/8016; H04M 15/00; H04M 15/62; H04M 5/57
See application file for complete search history.

(56) References Cited

U.S. PATENT DOCUMENTS

| | | | | |
|---|---|---|---|---|
| 2018/0069798 | A1* | 3/2018 | Bacik | H04L 43/026 |
| 2018/0152984 | A1* | 5/2018 | Palanisamy | H04W 76/12 |
| 2019/0166016 | A1* | 5/2019 | Livanos | H04W 28/16 |
| 2019/0239093 | A1* | 8/2019 | Zhang | H04L 5/001 |
| 2019/0313383 | A1* | 10/2019 | Xiong | H04W 16/14 |
| 2020/0029249 | A1* | 1/2020 | Livanos | H04W 28/20 |
| 2020/0052916 | A1 | 2/2020 | Kaki et al. | |

OTHER PUBLICATIONS

"3rd Generation Partnership Project; Technical Specification Group Services and System Aspects; Architecture enhancements to facilitate communications with packet data networks and applications (Release 16)," 3GPP TS 23.682, V16.3.0, pp. 1-132 (Jun. 2019).

"3rd Generation Partnership Project; Technical Specification Group Core Network and Terminals; T8 reference point for Northbound APIs; (Release 16)," 3GPP TS 29.122, V16.2.0, pp. 1-309 (Jun. 2019).

"3rd Generation Partnership Project; Technical Specification Group Core Network and Terminals; Policy and Charging Control (PCC); Reference points (Release 16)," 3GPP TS 29.212, V16.0.0, pp. 1-285 (Jun. 2019).

"3rd Generation Partnership Project; Technical Specification Group Core Network and Terminals; Policy and Charging Control over Rx reference point (Release 15)," 3GPP TS 29.214, V15.6.0, pp. 1-89 (Mar. 2019).

"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340, V15.6.0, pp. 1-69 (Jun. 2019).

"GTPP Interface Administration and Reference," Cisco, StarOS Release 21.9, pp. 1-586 (Aug. 10, 2018).

Notification of Transmittal of the International Search Report and the Written Opinion of the International Searching Authority, or the Declaration for International Application No. PCT/US2020/034705 (Sep. 2, 2020).

"5G System details for PCC," Ericsson, 3GPP Draft; S2-174210; pp. 1-272 (Jun. 2017).

"Handling Multiple BBERF—BBERF Reclassification," Alcatel-Lucent, 3GPP TSG-CT WG3 Meeting #52, pp. 1-4 (Apr. 2009)

* cited by examiner

METHODS, SYSTEMS, AND COMPUTER READABLE MEDIA FOR EXTENDING NEW RADIO (NR) USAGE INDICATIONS TO APPLICATION FUNCTION (AF)

TECHNICAL FIELD

The subject matter described herein relates to communicating NR usage indications to 4G network elements. More particularly, the subject matter described herein relates to methods, systems, and computer readable media for extending NR usage indications from a policy and charging rules function (PCRF) to an AF on the Rx or other northbound interface.

BACKGROUND

With the availability of 5G networks, user equipment (UEs) may support connectivity to 5G networks as well as 4G networks. 5G network connectivity is referred to as new radio or NR connectivity. 4G network connectivity is referred to as evolved universal terrestrial radio access (E-UTRA) connectivity. The radio access node that provides air interface connectivity in NR networks is the g-node B (gNB). The radio access node that provides air interface connectivity in 4G networks is the evolved node B (eNB).

Some network operators support dual-mode UEs that are capable of both E-UTRA and NR connectivity by using the E-UTRA network as the primary connection and the NR network as a secondary connection. In such situations, the eNB that provides E-UTRA connectivity is referred to as the master eNB (MeNB). The gNB that provides secondary connectivity to the NR network is referred to as the secondary gNB or SgNB.

It is desirable to have better interworking between the E-UTRA and NR and to allow a UE to utilize the NR network when the NR network would provide better quality of service (QoS). The PCRF may be aware of the NR connectivity of the UE. However, there is currently no mechanism available in the 4G network for the PCRF to report an indication of NR usage or availability to an AF, which may benefit from the enhanced QoS provided by the NR network to support a particular service provided to the UE. For example, the AF may support a video call or other bandwidth-intensive application that would benefit from the higher QoS provided by the NR network. Given the lack of a mechanism for communicating an indication of NR availability or unavailability to the AF, the AF may not be able to use the enhanced QoS provided by the NR.

Similar to the problem of a standardized way to communicate indications of NR usage to an application residing on an AF, there is also a lack of a standardized mechanism for communicating indications of NR usage to a service capability exposure function (SCEF), which can appear to the PCRF as an AF. Like an AF, the SCEF communicates with the PCRF via the Rx interface. However, there is no defined mechanism on the Rx interface for communicating NR availability to the SCEF. Because the SCEF does not receive the indications of NR availability or unavailability, application servers (ASs) that receive information about UEs from the SCEF likewise fail to receive the indications of NR availability or unavailability.

Accordingly, there exists a need for methods, systems, and computer readable media for extending NR usage indications to the AF.

SUMMARY

The subject matter described herein includes methods, systems, and computer readable media for extending NR usage indications to an AF. One method includes steps performed at a PCRF including at least one processor. The steps include receiving an indication of NR usage by a user equipment (UE). The steps further include determining that an AF is subscribed to receive indications of NR usage for the UE. The steps further include in response to determining that an AF is subscribed to receive indications of NR usage for the UE, communicating the indication of NR usage to the AF. The steps further include receiving a message from the AF to effect a change in service provided to the UE based on the indication of NR usage. The steps further include effecting the change in service provided to the UE based on the indication of NR usage.

According to another aspect of the subject matter described herein, receiving the indication of NR usage by the UE includes receiving a credit control request-update (CCR-U) message including the indication of NR usage.

According to yet another aspect of the subject matter described herein, communicating the indication of NR usage to the AF includes communicating the indication of NR usage in an extended-specific-action attribute value pair (AVP) carried in a reauthorization request message.

According to yet another aspect of the subject matter described herein, communicating the indication of NR usage to the AF comprises inserting a value indicating availability of NR as a secondary radio access type in the extended-specific-action AVP.

According to yet another aspect of the subject matter described herein, communicating the indication of NR usage to the AF comprises inserting a value indicating loss of availability of NR as a secondary radio access type carried in the extended-specific-action AVP.

According to yet another aspect of the subject matter described herein, communicating the indication of NR usage to the AF includes communicating the indication of NR usage to the AF over an Rx interface.

According to yet another aspect of the subject matter described herein, communicating the indication of NR usage to the AF includes communicating the indication of NR usage to a service capability exposure function (SCEF) or a network exposure function (NEF) that appears as the AF to the PCRF.

According to yet another aspect of the subject matter described herein, receiving a message from the AF to effect a change in service provided to the UE includes receiving an authentication authorization request-update (AAR-U) message from the AF.

According to yet another aspect of the subject matter described herein, the AAR-U message includes a media component description requesting access to NR bandwidth for providing enhanced quality of service to the UE.

According to yet another aspect of the subject matter described herein, the media component description specifies a codec that utilizes bandwidth provided by the NR.

According to yet another aspect of the subject matter described herein, a system for extending new radio (NR) usage indications to an AF is provided. The system includes a PCRF including at least one processor. The PCRF includes an NR-enabled policy controller implemented by the at least one processor for receiving an indication of NR usage by a user equipment (UE), determining that an AF is subscribed to receive indications of NR usage for the UE, in response to determining that an AF is subscribed to receive indications of NR usage for the UE, communicating the indication of NR usage to the AF, receiving a message from the AF to effect a change in service provided to the UE based on the indication of NR usage, and effecting the change in service provided to the UE based on the indication of NR usage.

According to yet another aspect of the subject matter described herein, the NR-enabled policy controller is configured to communicate the indication of NR usage in an extended-specific-action attribute value pair (AVP) carried in a reauthorization request message.

According to yet another aspect of the subject matter described herein, the NR-enabled policy controller is configured to communicate a value indicating availability of NR as a secondary radio access type in the extended-specific-action AVP.

According to yet another aspect of the subject matter described herein, the NR-enabled policy controller is configured to insert a value indicating loss of availability of NR as a secondary radio access type in the extended-specific-action AVP.

According to yet another aspect of the subject matter described herein, the NR-enabled policy controller is configured to communicate the indication of NR usage to the AF over an Rx interface.

According to yet another aspect of the subject matter described herein, the NR-enabled policy controller is configured to communicate the indication of NR usage to a service capability exposure function (SCEF) or a network exposure function (NEF) that appears as the AF to the PCRF.

According to yet another aspect of the subject matter described herein, the NR-enabled policy controller is configured to receive an authentication authorization request-update (AAR-U) message from the AF.

According to yet another aspect of the subject matter described herein, the AAR-U message includes a media component description requesting access to NR bandwidth for providing enhanced quality of service to the UE.

According to yet another aspect of the subject matter described herein, the media component description specifies a codec that utilizes bandwidth provided by the NR.

According to yet another aspect of the subject matter described herein, a non-transitory computer readable medium having stored thereon executable instructions that when executed by a processor of a computer control the computer to perform steps is provided. The steps include receiving an indication of NR usage by a user equipment (UE). The steps further include determining that an application function (AF) is subscribed to receive indications of NR usage for the UE. The steps further include, in response to determining that an AF is subscribed to receive indications of NR usage for the UE, communicating the indication of NR usage to the AF. The steps further include receiving a message from the AF to effect a change in service provided to the UE based on the indication of NR usage. The steps further include effecting the change in service provided to the UE based on the indication of NR usage.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

As stated above, some UEs may be capable of connecting to both the E-UTRA network and the NR network. It is desirable for such UEs to provide an indication of NR usage to the AF so that the AF can utilize the NR to provide better QoS to the UE. As used herein, the term "indication of NR usage" includes an indication that a UE is connected to the NR network, an indication that the UE has become disconnected from the NR network, or any other indication associated with the availability of the NR network to the UE. As will be described in detail below, indications may be communicated to the AF using an attribute value pair (AVP) carried in a Diameter or other protocol message sent to the AF.

Figure 1:
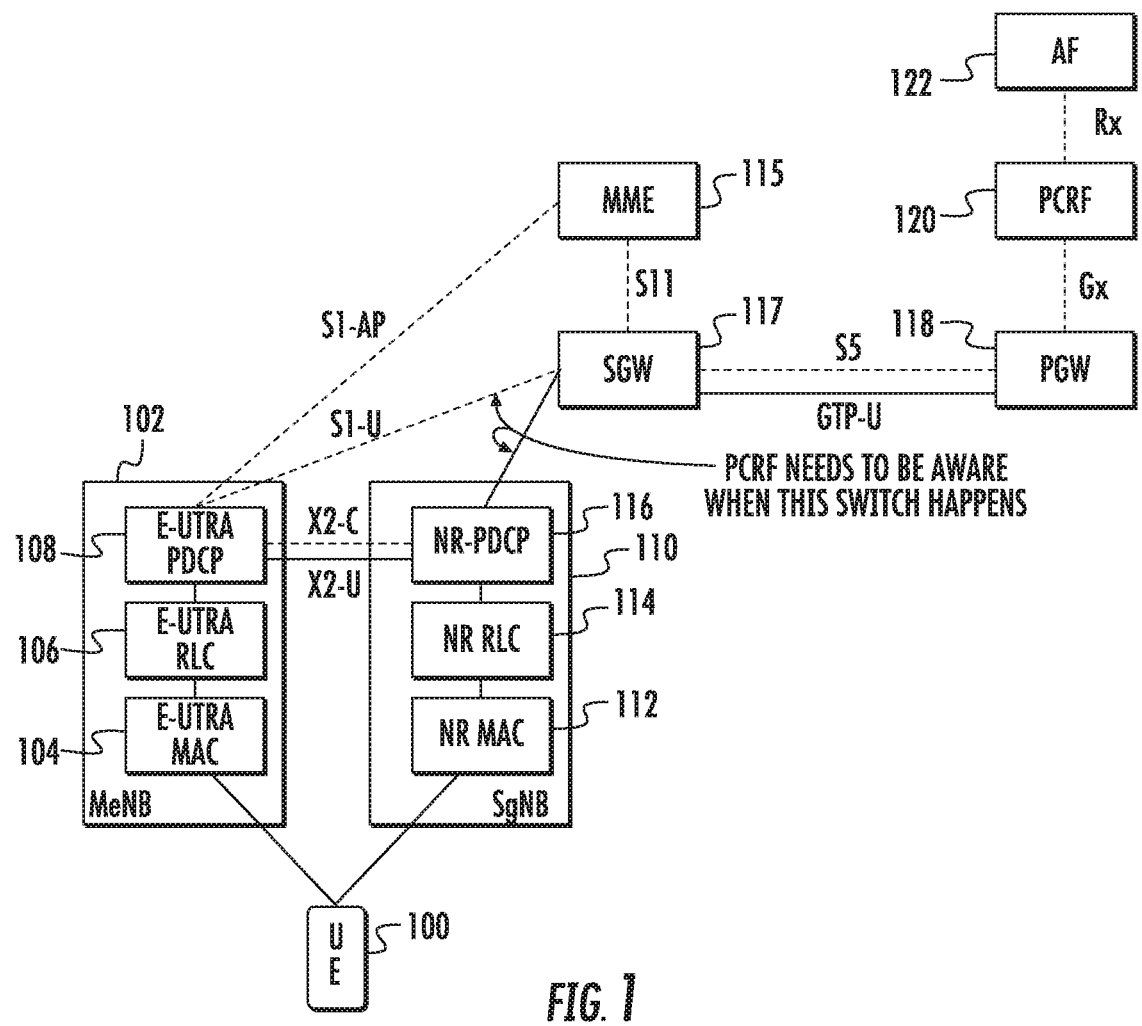
FIG. 1 is a network diagram illustrating 5G NR signaling to the EPC core, where indications of NR usage are communicated to the PCRF but not the AF.

FIG. 1 is a network diagram illustrating a UE that is connected to both the E-UTRA network and the NR network, where the connection to the E-UTRA network is the primary network connection and the connection to the NR network is the secondary network connection. Referring to FIG. 1, UE 100 is connected to the E-UTRA network via MeNB 102. MeNB 102 implements an E-UTRA medium access control (MAC) layer 104, an E-UTRA radio link control (RLC) layer 106, and an E-UTRA packet data connectivity protocol (PDCP) layer 108. Although not shown in detail in FIG. 1, UE 100 includes physical layer, MAC layer, RLC layer, and PDCP layer functions for both the E-UTRA and NR networks. It should also be noted that UE 100 may be a mobile phone, an Internet of things (IoT) device, or any other device capable of radio connectivity via the E-UTRA and NR networks.

In the illustrated example, S-gNB 110 provides secondary connectivity of UE 100 to the NR network. S-gNB 110 includes an NR MAC layer 112, an NR RLC layer 114 and an NR PDCP layer 116. The interface between MeNB 102 and SgNB 110 is referred to as the X2 interface. In the illustrated example, the X2 interface is divided into the X2 control (X2-C) and X2 user plane (X2-U) interfaces. The X2 interface is used for negotiation between MeNB 102 and SgNB 110 when a handover occurs. The X2 interface may also be used to exchange indications of inter-cell interference.

Support for dual connectivity using the NR network as a secondary radio access type is defined in 3GPP TS 23.401, Technical Specification Group Services and System Aspects; General Packet Radio Service (GPRS) Enhancements for Evolved Universal Terrestrial Radio Access Network (E-UTRAN) access (Release 16), V16.3.0 (2019-06), the disclosure of which is incorporated herein by reference in its entirety. According to 3GPP TS 23.401, if the UE has support for dual connectivity with the NR, the UE reports this capability to the eNB. The eNB then selects a signaling gateway (SGW) and a packet gateway (PGW) that support dual connectivity so that the NR can serve as a secondary radio access type for the UE.

The mobility management entity (MME) 115 performs mobility management functions for UEs connected to the E-UTRA network. The signaling gateway (SGW) 117 determines when a UE switches from E-UTRA to NR connectivity and vice-versa. A PGW 118 communicates with SGW 117 via the S5 interface and communicates packet data to UE 100. PGW 118 also communicates with PCRF 120 via the Gx interface or reference point to receive policies from PCRF 120 used to control the UE's QoS. PGW 118 serves as a policy and charging enforcement function (PCEF) to enforce the policies received from PCRF 120 over the Gx interface. PCRF 120 communicates with AF 122 via the Rx interface or reference point. PCRF 120 performs policy control functions for UE 100 and thus needs to be aware of the type(s) of air interface connectivity available to UE 100. While there are existing mechanisms defined on the Gx interface for communicating NR usage indications to the PCRF, there are no defined mechanisms for communicating NR usage indications to applications, such as AF 122, via northbound interfaces, such as the Rx interface.

The Rx interface is defined in 3GPP TS 29.214, Technical Specification Group Core Network and Terminals; Policy and Charging Control Over Rx Reference Point (Release 15), V15.6.0 (2019-03), the disclosure of which is incorporated herein by reference in its entirety. 3GPP TS 29.214 defines interactions between the PCRF and the AF over the Rx reference point. 3GPP TS 29.214 defines AVPs, such as extended-min-requested-BW-NR, which allow the AF to request bandwidth provided by the NR to be in policies from the PCRF. However, there are no AVPs or other mechanisms defined in 3GPP TS 29.214 for the PCRF to report indications of NR usage to the AF. For example, there are no AVPs for the PCRF to report availability of the NR as a secondary radio access type or loss of availability of the NR as a secondary radio access type to the AF. Further, there is no defined mechanism for the AF to subscribe with the PCRF to receive such notifications.

Interworking between the E-UTRA and NR is supported with multi-radio access type (RAT) dual connectivity (MR-DC) operation using the E-UTRA and NR. The master network (in this case the E-UTRA) is responsible for handover of communications to the secondary network. The secondary network (SN) (in this case, the NR) provides offloading to increase the overall data rate. Handover between the NR and E-UTRA is supported via inter-RAT handover.

Dual connectivity using the E-UTRA and the NR is described in detail in 3GPP TS 37.340, Technical Specification Group Radio Access Network; Evolved Universal Terrestrial Radio Access (E-UTRA) and NR; Multi-connectivity; Stage 2 (Release 15), V15.6.0 (2019-06), the disclosure of which is incorporated herein by reference in its entirety. There are three types of dual connectivity that involve the NR described in TS 37.340. These types are E-UTRA-NR dual connectivity where the UE is connected to one eNB that acts as a master node and one gNB that acts as a secondary node, NR-EUTRA dual connectivity in which the UE is connected to one gNB that aces as a master node and one eNB that acts as a secondary node, and NR-NR dual connectivity in which the UE is connected to one gNB that acts as a master node and one gNB that acts as a secondary node. Although the examples described below relate primarily to using the NR as a secondary radio access type, the subject matter described herein is not limited to only this dual connectivity scenario. The subject matter described herein may provide indications of NR usage to an AF for any dual connectivity scenario in which the NR is functioning a primary, secondary, or both radio access types.

Whenever an SgNB (which provides for NR usage) is added or removed for a bearer, an indication to PCRF 120 is necessary to shape policies accordingly. However, over-the-top (OTT) applications, such as those provided by AF 122, may not receive such indications of NR usage because there is no defined mechanism on the Rx interface for communicating such indications to AF 122. The subject matter described herein provides a mechanism for the PCRF to notify AF 122 via the Rx or other suitable interface of NR connectivity.

One reason that indications of NR usage need to be communicated to the PCRF is that only blind SgNB addition is defined in 3GPP without NR measurement during LTE handover to the eNB. Another reason that indications of NR usage need to be communicated to the PCRF is that the secondary node addition procedure is initiated by the MeNB and used to establish a UE context as the SgNB to provide radio resources from the SgNB to the UE. The indication of NR connectivity also needs to be communicated to the PCRF to fetch updated policies in the case of NR usage in option 3X defined by the 3GPP. Option 3X allows NR connectivity to be managed by a 4G core network, such as that illustrated in FIG. 1.

As indicated above, the Rx interface specification, does not specify a method for the PCRF to indicate NR usage to the AF. NR networks target 20 gigabits per second for downlink and 10 gigabits per second for uplink. Multiple mechanisms are defined to indicate availability of NR as a secondary RAT from the PGW to the PCRF to reevaluate QoS enforced for the PDP session. The Gx interface or reference point is defined in 3GPP TS 29.212, Technical Specification Group Core Network and Terminal; Policy and Charging Control (PCC); Reference Points (Release 16), V16.0.0 (2019-06), the disclosure of which is incorporated herein by reference in its entirety. According to 3GPP TS 29.212, when an Internet protocol connectivity access network (IP CAN) session is being established, if the PCEF supports extended bandwidth provided by the NR, the PCEF can indicate the NR bandwidth support to the PCRF using AVPs defined in 3GPP TS 29.212. However, 3GPP TS 29.212 does not provide for communicating the NR bandwidth capabilities to the AF. Even though the Rx interface has extended QoS parameters, such as the above-described extended-min-requested-BW-NR AVP, 3GPP does not identify procedures for the PCRF to communicate availability of the NR to the AF. If the AF can identify the high data rate potential of the UE's connectivity, the AF can enable better QoS or negotiate different codecs based on available resources. Accordingly, the Rx or other northbound interface can be enhanced to provide an indication of NR usage to the AF. The AF can, based on the indication, renegotiate a session for better quality of service. To avoid backward compatibility issues, a new AVP, "extended-specific-action" is proposed to indicate availability of access to the NR. The new AVP is of type enumerated with vendor ID "Oracle Tekelec" (323) and may have the following values:

1. Indication_of_NR_AS_secondary_RAT; and
2. Indication_of_loss_of_connectivity_to_NR_AS_secondary_RAT.

Within an AA request, the AF may use the extended-specific-action AVP to request that the PCRF notify the AF of NR usage. Within a PCRF-initiated reauthorization request, the extended-specific-action AVP may determine the type of event being notified. This is similar to the behavior defined for the specific action AVP in section 5.3.13 of 3GPP TS 29.214. According to section 5.3.13 of 3GPP TS 29.214, the PCRF may include the specific action AVP with AVP code 518 in a reauthorization request sent to the AF. The specific action AVP determines the type of action requested by the reauthorization request. 3GPP TS 29.214 states that within an initial AA request, the AF may use the specific action AVP to request any specific action from the server, which in this case is the PCRF, at bearer events and to limit contact to such bearer events where such specific action is required. If the specific action AVP is omitted from an initial AA request, no notification of any events defined in 3GPP TS 29.214 is requested. Examples of specific actions defined in 3GPP TS 29.214 are charging correlation exchange for reporting an access network charging identifier to the AF, indication of loss of bearer for reporting a loss of a bearer with the UE, indication of recovery of bearer for indicating recovery of a bearer, indication of release of bearer for indicating release of a bearer channel with a UE, etc. The new extended-specific-action AVP contains NR usage indications, specifically, the indication of NR as a secondary RAT and the indication of loss of connectivity to the NR as a secondary RAT.

Figure 2A:
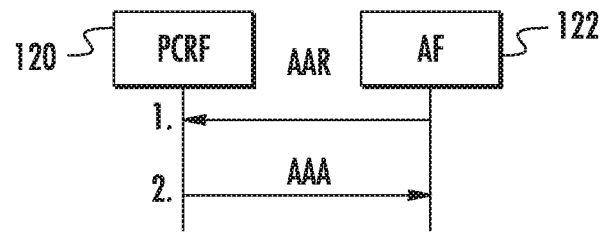
FIG. 2A is a message flow diagram where the AF subscribes with the PCRF to receive indications of NR usage.

FIG. 2A is a message flow diagram illustrating an AF subscribing with a PCRF to receive indications of NR usage. Referring to FIG. 2A, in line 1, AF 122 sends a Diameter authentication authorization request (AAR) message to PCRF 120. The AAR message may identify, in addition to the authentication parameters normally carried in an AAR message, the above-referenced extended-specific-action AVP with the values of:

indication_of_NR_as_secondary_RAT, and
indication_of_loss_of_connectivity_to_NR_as_secondary_RAT, which indicate that the AF wants to receive notifications of NR availability and loss of NR availability.

Upon receiving the message, PCRF 120 authenticates the sender and sends an authorization authentication answer (AAA) message to AF 122 confirming that AF 122 is authenticated and that the subscription to receive indications of NR usage has successfully been created. After the call flow illustrated in FIG. 2A, PCRF 120 will notify AF 122 when PCRF 120 receives indications of NR usage for the UE or UEs identified in the subscription request.

Figure 2B:
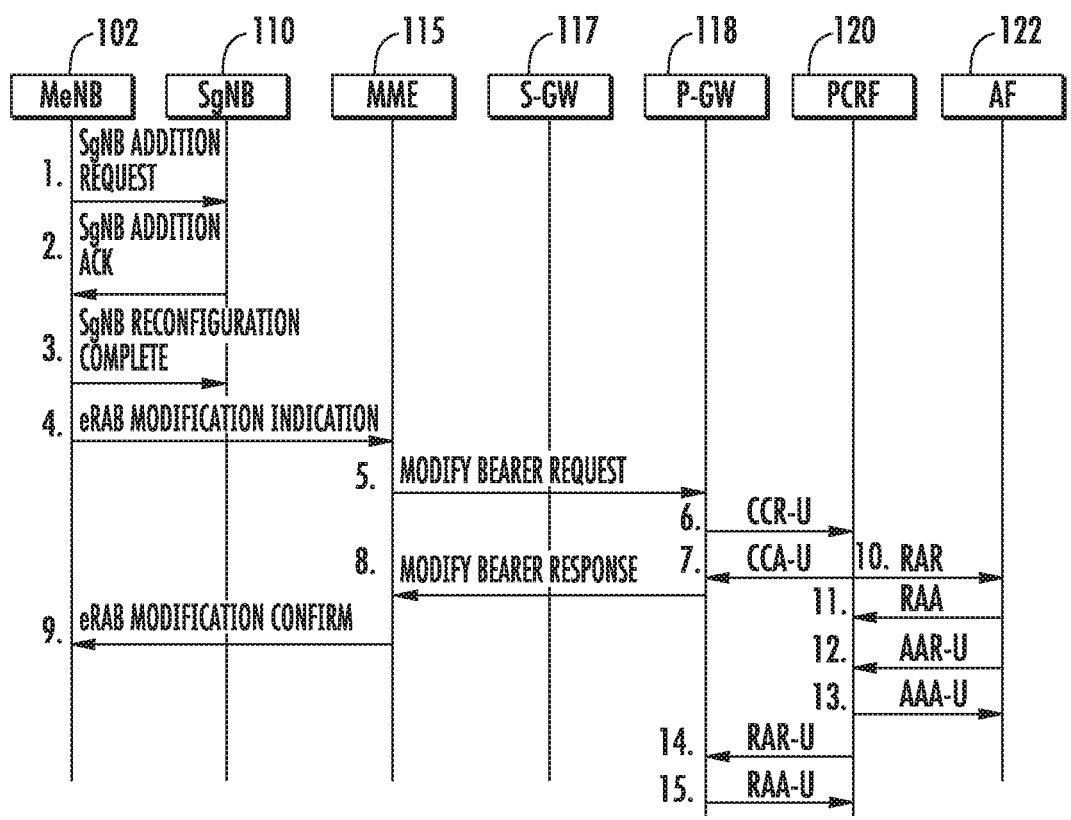
FIG. 2B is a message flow diagram illustrating exemplary messaging associated with providing an indication of NR usage to the PCRF and to the AF.

FIG. 2B is a message flow diagram illustrating the extending of NR usage indications to the AF. Referring to FIG. 2B, it is assumed that a UE (not shown) has primary connectivity to the E-UTRA via MeNB 102, the UE is capable of having dual connectivity via the E-UTRA and the NR, and the NR is currently available to the UE. To initiate dual connectivity using the NR, in line 1 of the message flow diagram, MeNB 102 sends an SgNB addition request to SgNB 110. The SgNB addition request is part of the SgNB addition preparation procedure to request that the SgNB allocate resources for new radio connectivity for a specific UE. In line 2, SgNB 110 acknowledges the SgNB addition request by sending an SgNB addition answer message to MeNB 102 confirming allocation of NR connectivity resources for the UE.

In line 3, MeNB 102 sends an SgNB reconfiguration complete message to SGNB 110. The SgNB reconfiguration complete message provides confirmation to SgNB 110 that the UE has successfully configured itself for NR connectivity.

In line 4 of the message flow diagram, MeNB 102 sends an e-UTRAN radio access bearer (eRAB) modification indication to MME 115. The e-RAB modification indication is part of the path update procedure to update the user plane path to use the NR for communication with the UE. In line 5, MME 115 sends a modify bearer request message to PGW 118.

In line 6, PGW 118 sends a credit control request-update (CCR-U) message to PCRF 120. The CCR-U message may indicate availability of the NR as a secondary RAT. In line 7 of the message flow diagram, PCRF 120 acknowledges the CCR-U message by sending a credit control answer update (CCA-U) message to PGW 118. In line 8, PGW 118 sends a modify bearer response message to MME 115. In line 9, MME 115 sends an eRAB modification confirm message to MeNB 102. After line 9, secondary connectivity of the UE via the NR is available.

In line 10, PCRF 120, via the Rx interface, sends a reauthorization request (RAR) message to AF 122. The RAR message includes the extended-specific-action AVP. In this example, the extended-specific-action AVP carries an indication of NR availability as a secondary RAT. In line 11, AF 122 acknowledges the RAR message by sending a reauthorization answer (RAA) message to PCRF 120.

After receiving the indication of NR availability, AF 122 may utilize the higher connectivity provided by the NR. In line 12, the AF 122 sends an authentication authorization request-update (AAR-U) message to PCRF 120. The AAR-U message includes a media component description with enhanced QoS. For example, the media component description may include higher quality codecs that consume the additional bandwidth provided by the NR network. In line 13, PCRF 120 responds to AF 122 with an AAA-U message.

In line 14, PCRF 120 sends an RAR-U message to PGW 118. The RAR-U message contains policy parameters that allow the UE and the AF to communicate using the NR. Additional signaling between downstream network elements, such as the MME, SgNB, MeNB, and UE may also be performed to indicate utilization of the NR. In line 15, PGW 118 sends an RAA-U message to PCRF 120.

After line 15, AF 122 can communicate with the UE using enhanced quality of service provided by the NR network. For example, AF 122 may be a voice over IP application, a video application, or a gaming application requiring intensive bandwidth. After being notified of the availability of NR connectivity, AF 122 may negotiate with PCRF 120 as in lines 12 and 13, to provide enhanced quality of service to the application. Similarly, if PCRF 120 communicates an indication of loss of NR connectivity to AF 122 via the Rx or other interface, AF 122 may negotiate with PCRF 120 to cease using the NR network and fall back to using the existing E-UTRA network connection to communicate with the UE. The call flow for such a case will be the same as that illustrated in FIG. 2B except that the indication of availability NR as a secondary NF is replaced with an indication of loss of connectivity to NR as a secondary RAT.

It should be noted that the subject matter described herein allows an AF to use both the NR and the E-UTRAN to provide the required QoS for an application. In such an example, the NR may be used to provide a portion of the bandwidth provided by an application and the E-UTRAN may be used to provide a remainder of the bandwidth required by the application. Thus, just because the NR is available does not mean that the NR will be used exclusively to satisfy the bandwidth needs of an application.

Figure 3:
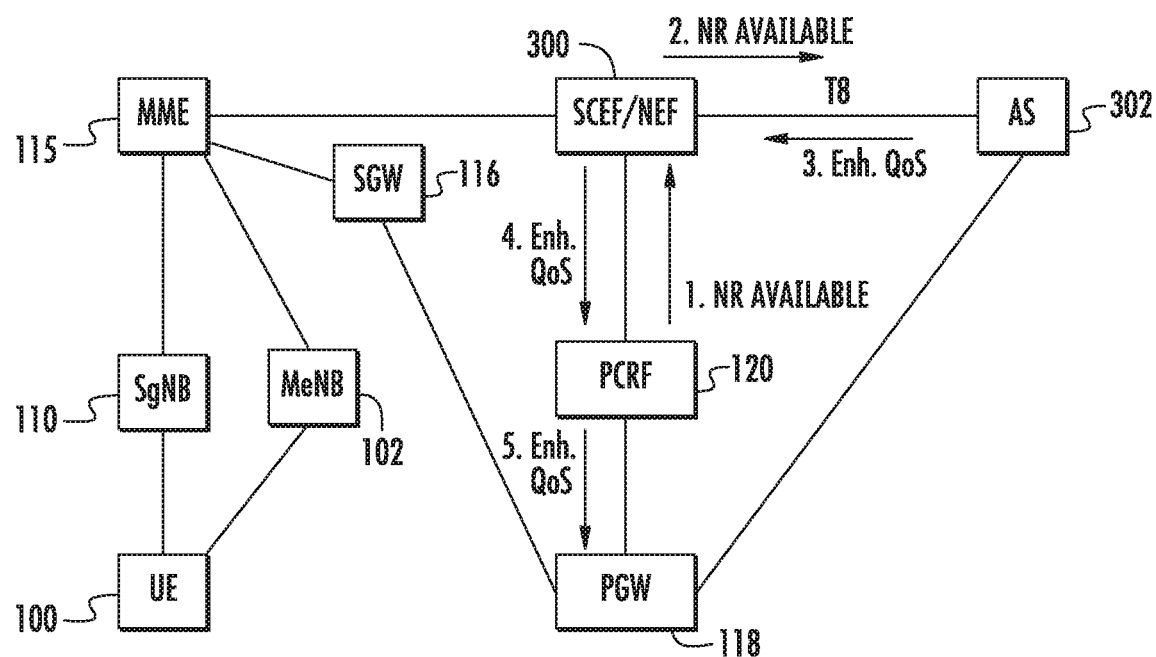
FIG. 3 is a network diagram illustrating the PCRF extending NR usage indications to the SCEF/NEF, which appears as an AF to the PCRF.

In another example, the PCRF may extend NR usage indications to a service capability exposure function (SCEF) or network exposure function (NEF) and the SCEF/NEF may use the information to enhance background data transfer to the UE. FIG. 3 is a network diagram illustrating such a use case. Referring to FIG. 3, it is assumed that UE 100 has established dual connectivity to the NR and the E-UTRA via SgNB 110 and MeNB 102. MME 115 communicates the indication of NR availability as a secondary radio access type to SGW 117, SGW 117 communicates the indication to PGW 118, and PGW 118 communicates the indication to PCRF 120. The communication of the indication of NR availability to PCRF 120 may occur using steps 1 through 7 illustrated in FIG. 2B.

Referring to the message flow illustrated in FIG. 3, in step 1, PCRF 120 communicates the indication of NR availability to SCEF/NEF 300. This communication may be effected using the monitoring events procedures described in 3GPP TS 23.682, Technical Specification Group Services and System Aspects; Architecture Enhancements to Facility Communications with Packet Data Networks and Applications (Release 16), V16.3.0 (2019-06), the disclosure of which is incorporated herein by reference in its entirety. According to 3GPP TS 23.682, the monitoring events procedure can be used to monitor UE reachability. According to the subject matter described herein, the monitoring events procedure can be extended using the indications of NR availability and the extended-specific-action AVP described above. According to the procedure, the SCEF may act as an AF and establish an active Rx session with the PCRF to receive notification of events. Such a session may be established using the AAR and AAA messaging illustrated in FIG. 2A except that the AF is replaced by the SCEF acting as an AF. Once the subscription is created, when PGW 118 notifies PCRF 120 of NR availability, PCRF 120 may notify SCEF/NEF 300 of the indication of NR availability.

Continuing with the message flow in FIG. 3, SCEF/NEF 300 may inform application server (AS) 302 of the indication of NR availability via the T8 interface. The T8 interface or reference point is described in 3GPP TS 29.122, Technical Specification Group Core Network and Terminals; T8 Reference Point for Northbound APIs; (Release 16), V16.2.0 (2019-06), the disclosure of which is incorporated herein by reference in its entirety. According to 3GPP TS 29.122, an AS can request that the SCEF notify the AS of certain events concerning a UE. Examples of such events are reachability and changes in location. The monitoring events procedure can be extended to include the above described notifications of NR availability or loss of availability. In FIG. 3, it is assumed that AS 302 has previously subscribed to receive notification of NR availability or unavailability from SCEF/NEF 300 and that SCEF/NEF 300 has established the corresponding monitoring event notification subscription of PCRF 120. Continuing with the message flow in FIG. 3, in step 2, SCEF/NEF 300 notifies AS 302 of the indication of NR availability. In step 3, AS 302 communicates with SCEF/NEF 300 with an indication that AS 302 desires to use the increased bandwidth provided by the NR. In step 4, SCEF/NEF 300 communicates the indication that AF 302 would like to use the enhanced NR bandwidth to PCRF 120. PCRF 120 selects and appropriate policy from its policy data store and communicates the policy to PGW 118. PGW 118 may signal with SGW 117 for the increased bandwidth to be provided to the UE. SGW 117 may signal with MME 115, which signals with MeNB 102 and SgNB 110 to indicate that the NR will be used for the application. Finally, MeNB 102 and SgNB 110 signal with UE 100 to indicate that the NR will be used by the application.

Figure 4:
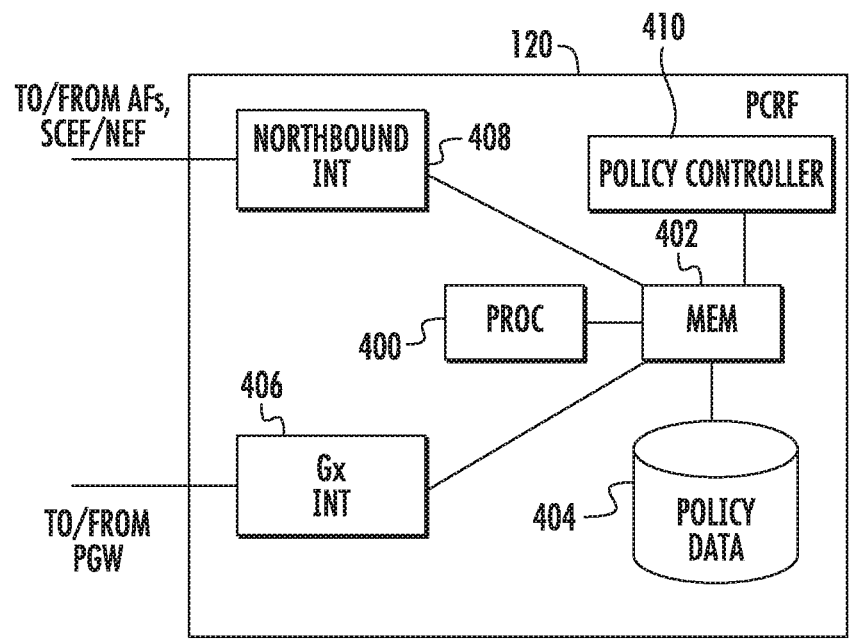
FIG. 4 is a block diagram illustrating an exemplary PCRF for extending NR usage indications to the AF.

FIG. 4 is a block diagram illustrating an exemplary PCRF for extending NR usage indications to the AF. Referring to FIG. 4, PCRF 120 includes at least one processor 400 and a memory 402. PCRF 120 includes policy data store 404, which may reside in memory 402, for making policy decisions relating to UEs and applications seeking to use network resources. PCRF 120 further includes a Gx interface module 406 for communicating with PGW 118 via the Gx interface. PCRF 120 also includes a northbound interface module 408 for communicating with AFs and/or with SCEF/NEF 300, which appears as an AF. Northbound interface module 408, in one example, may communicate with AFs or with SCEF/NEF 300 via the Rx interface. However, the subject matter described herein is not limited to communicating indications of NR usage over the Rx interface. Any interface through which a PCRF may communicate indications of NR usage to applications, an SCEF, or an NEF is intended to be within the scope of the subject matter described herein.

PCRF 120 further includes an NR-enabled policy controller 410 for receiving the indications of NR usage from the PGW, determining whether one or more AFs are subscribed to receive indications of NR usage for a UE, and communicating the indications of NR usage to the AF. For example, NR-enabled policy controller 410 may be configured to receive the indications of NR usage from the PCRF. NR-enabled policy controller 410 may extract a UE identifier (e.g., international mobile station identity (IMSI) or external identifier) from the message from the PGW indicating NR usage, perform a lookup in policy data store 404 using the UE identifier to determine whether one or more AFs are subscribed to receive indications of NR usage for the UE. If the result of the lookup is that one or more AFs are subscribed to receive the indications of NR usage, NR-enabled policy controller 410 may be configured to communicate the indication of NR usage to the subscribed AF(s) over the Rx interface. NR-enabled policy controller 410 may communication the indication of NR usage to the AFs using by inserting, in the extended-specific-action AVP, a value indicating availability of NR as a secondary radio access type or a value indicating loss of NR availability as a secondary radio access type.

NR-enabled policy controller 410 may also be configured to communicate with a SCEF or NEF that appears as an AF to PCRF 120. For example, NR-enabled policy controller 410 may receive and store subscription data from an SCEF or NEF that indicates the SCEF or NEF is subscribed to receive indications of NR usage for a UE and use the subscription data to contact the SCEF or NEF when an indication of NR usage is received for the UE.

NR-enabled policy controller 410 may further to configured to receive a message from an AF to effect a change in service provided to a UE and to effect the requested change in service. For example, NR-enabled policy controller 410 may receive an AAR-U message from the AF, where the AAR-U message includes a media component description requesting access to NR bandwidth for providing enhanced quality of service to the UE. In one example, the media component description specifies a codec that utilizes bandwidth provided by the NR, and NR-enabled policy controller 410 may signal with the PCEF, which may be the PGW, to communicate the media component description to the UE. The UE may then signal with the air interface node, such as the gNB, to negotiate a new codec that utilizes the enhanced bandwidth provided by the NR.

Figure 5:
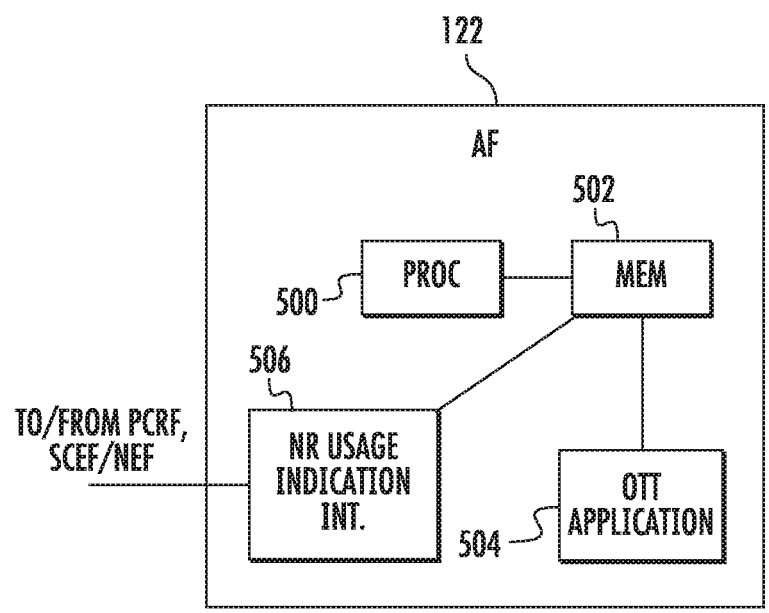
FIG. 5 is a block diagram of an exemplary AF for utilizing NR usage indications received from the PCRF.

FIG. 5 is a block diagram illustrating an exemplary AF for communicating with PCRF 120 to obtain indications of NR usage and use those indications to enhance UE quality of service. Referring to FIG. 5, AF 122 includes at least one processor 500 and a memory 502. AF 122 may also include an over the top (OTT) application 504, such as a voice over IP, gaming, or video application. AF 122 further includes an NR usage indication interface 506 for receiving indications of NR availability from a PCRF and communicating the indications of NR usage to OTT application 504. OTT application 504 may then utilize the indications of NR usage to negotiate with the PCRF to enhance quality of service providing to a UE. In one example, NR usage indication interface 506 may be the Rx interface modified to support the indications of NR usage described above.

Figure 6:
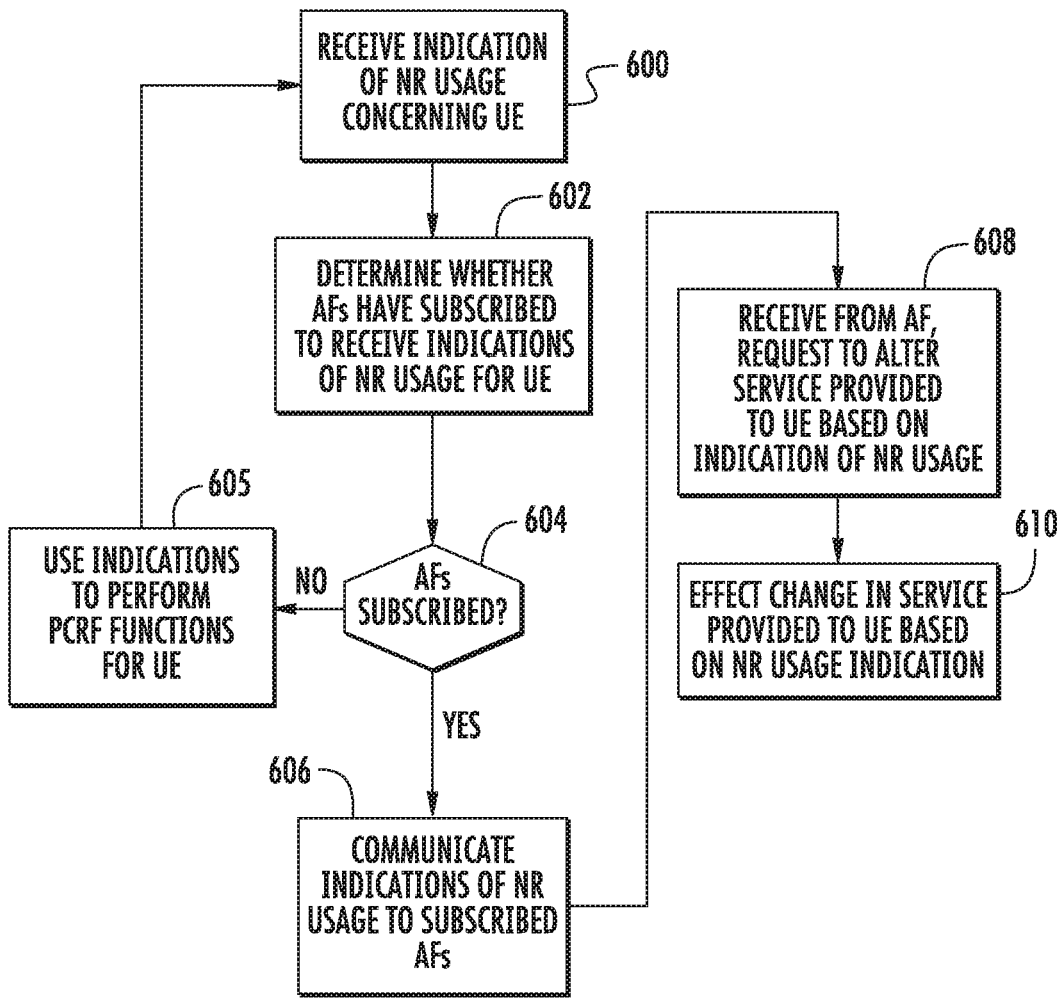
FIG. 6 is a flow chart illustrating an exemplary process performed by a PCRF for extending NR usage indications to the AF.

FIG. 6 is a flow chart illustrating an exemplary process for communicating NR usage to an AF and utilizing the indications of NR usage and allowing the AF to utilize the indications of NR usage to alter quality of service provided to a UE. Referring to FIG. 6, in step 600, the PCRF receives an indication of NR usage concerning a UE. For example, PCRF 120 may receive via the Gx or other interface an indication that a UE has NR connectivity or that a UE that previously had NR connectivity has lost NR connectivity. The indication may be communicated using the extended-specific-action AVP including one of the two values described above.

In step 602, PCRF determines whether any AFs have subscribed to receive indications of NR usage. As stated above with respect to FIG. 2A, an AF or an SCEF/NEF that appears to the PCRF to be an AF may subscribe with PCRF 120 to be notified when a UE has or loses NR connectivity as a secondary RAT. In step 602, if there are no AFs subscribed to receive the indication of NR usage, control proceeds to step 604 or where the PCRF uses the indication to perform PCRF functions for the UE without communicating the indications to any AFs. Using the indications to perform normal PCRF functions may include selecting policies to apply to the UE based on the indications.

In step 604, if it is determined that AFs have subscribed to receive the indications of NR usage, control proceeds to step 606 where the PCRF communicates the indications of NR usage to subscribed AFs. Communicating the indications of NR usage to subscribed AFs may include sending an RAR or other message to a subscribed AF via the Rx or other interface to notify the AFs of the indications of NR usage. The indications of NR usage may be carried in the extended-specific-action AVP and may indicate availability of NR as a secondary connection or loss of availability of NR as a secondary connection.

In step 608, the PCRF receives, from an AF, a request to alter service provided to a UE based on an indication of NR usage previously communicated to the AF. For example, PCRF 120 may receive an AAR-U message on the Rx or other interface to alter service provided to a UE. The request may include a request to utilize enhanced codecs or increased bandwidth provided by the NR.

In step 610, PCRF 120 effects a change in service provided to the UE based on the indication of NR usage. Effecting a change in service provided to the UE may include accessing a policy data store of the PCRF and extracting a policy to effect the change in service requested by the AF and communicating the policy to a policy and charging enforcement function (PCEF), which in this case is PGW 118. For example, PCRF 120 may send an RAR message to PGW 118 where the RAR message includes the policy with enhanced QoS parameters to utilize the increased bandwidth provided by the NR. PCRF 120 may also send an AAA message to AF 122 confirming receipt of the request for enhanced QoS.

Figure 7:
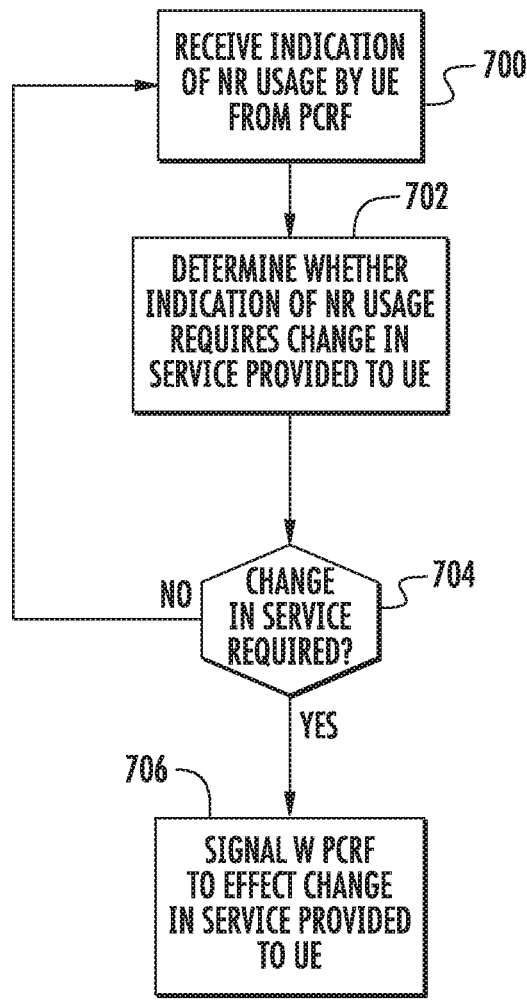
FIG. 7 is a flow chart of an exemplary process performed by an AF for obtaining and utilizing indications of NR usage.

FIG. 7 is a flow chart illustrating exemplary process performed by an AF in response to receiving an indication of NR usage by a UE from a PCRF. Referring to FIG. 7, in step 700, the AF receives an indication of NR usage by a UE from a PCRF. For example, AF 122 may receive a message from PCRF 120 via the Rx or other northbound interface that indicates availability of NR as a secondary radio access type or a loss of availability of NR as a secondary radio access type. The indication may be transmitted or communicated to the AF in the extended-specific-action AVP described above.

In steps 702 and 704, the AF determines whether the indication of NR usage requires a change in service provided to the UE. In step 704, if a change in service is not required, control returns to step 700 to process the next notification.

If the change in service is required, control proceeds to step 706, where AF signals with the PCRF to affect the change in service provided to the UE. For example, AF 122 may signal with PCRF 120 to enhance quality of service provided to the UE in response to receiving an indication of availability of NR as a secondary radio access type. In an alternate example, AF 122 may signal with PCRF 120 to reduce quality of service given to a UE in response to receiving a notification of loss of availability of NR as a secondary radio access type.

The subject matter described herein provides for a better user experience by allowing an AS session to be communicated with enhanced QoS. This is particularly beneficial for IoT use cases where the communication to or from the IoT devices demand higher bandwidth. Better codecs and QoS may also be provided. The SCEF-NEF can use information to tune use cases related to background data transfer and optimize network resources.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for extending new radio (NR) usage indications to an application function (AF), the method comprising:
    at a policy and charging rules function (PCRF) including at least one processor:
        receiving an indication of NR usage by a user equipment (UE), wherein the indication of NR usage includes an indication of NR as a radio access type for the UE, indicating that the UE is connected to a network via an NR connection;
        determining that an AF is subscribed to receive indications of NR usage for the UE;
        in response to determining that an AF is subscribed to receive indications of NR usage for the UE, communicating the indication of NR usage to the AF;

receiving a message from the AF with a media component description identifying at least one media component capable of using increased bandwidth provided by the NR connection; and modifying service provided to the UE to utilize the at least one media component capable of using the increased bandwidth by the NR connection based on the indication of NR usage.

2. The method of claim 1 wherein receiving the indication of NR usage by the UE includes receiving a credit control request-update (CCR-U) message including the indication of NR usage.

3. The method of claim 1 wherein communicating the indication of NR usage to the AF includes communicating the indication of NR usage in an extended-specific-action attribute value pair (AVP) carried in a reauthorization request message.

4. The method of claim 3 wherein communicating the indication of NR usage to the AF comprises inserting a value indicating availability of NR as a secondary radio access type in the extended-specific-action AVP.

5. The method of claim 1 wherein communicating the indication of NR usage to the AF includes communicating the indication of NR usage to the AF over an Rx interface.

6. The method of claim 1 wherein communicating the indication of NR usage to the AF includes communicating the indication of NR usage to a service capability exposure function (SCEF) or a network exposure function (NEF) that appears as the AF to the PCRF.

7. The method of claim 1 wherein receiving the message from the AF includes receiving an authentication authorization request-update (AAR-U) message from the AF.

8. The method of claim 7 wherein the AAR-U message includes the media component description requesting access to NR bandwidth for providing enhanced quality of service to the UE.

9. The method of claim 1 wherein the at least one media component comprises a codec that utilizes the increased bandwidth provided by the NR connection.

10. A system for extending new radio (NR) usage indications to an application function (AF), the system comprising:
   a policy and charging rules function (PCRF) including at least one processor; and
   an NR-enabled policy controller implemented by the at least one processor for receiving an indication of NR usage by a user equipment (UE), wherein the indication of NR usage includes an indication of NR as a radio access type for the UE, indicating that the UE is connected to a network via an NR connection;
   determining that an AF is subscribed to receive indications of NR usage for the UE, in response to determining that an AF is subscribed to receive indications of NR usage for the UE, communicating the indication of NR usage to the AF, receiving a message from the AF with a media component description identifying at least one media component capable of using increased bandwidth provided by the NR connection, and modifying service provided to the UE to utilize the at least one media component capable of using the increased bandwidth by the NR connection based on the indication of NR usage.

11. The system of claim 10 wherein the NR-enabled policy controller is configured to communicate the indication of NR usage in an extended-specific-action attribute value pair (AVP) carried in a reauthorization request message.

12. The system of claim 11 wherein the NR-enabled policy controller is configured to communicate a value indicating availability of NR as a secondary radio access type in the extended-specific-action AVP.

13. The system of claim 10 the NR-enabled policy controller is configured to communicate the indication of NR usage to the AF over an Rx interface.

14. The system of claim 10 wherein the NR-enabled policy controller is configured to communicate the indication of NR usage to a service capability exposure function (SCEF) or a network exposure function (NEF) that appears as the AF to the PCRF.

15. The system of claim 10 wherein the message from the AF comprises an authentication authorization request-update (AAR-U) message.

16. The system of claim 15 wherein the AAR-U message includes the media component description requesting access to NR bandwidth for providing enhanced quality of service to the UE.

17. The system of claim 10 wherein at least one media component comprises a codec that utilizes the increased bandwidth provided by the NR connection.

18. A non-transitory computer readable medium having stored thereon executable instructions that when executed by a processor of a computer control the computer to perform steps comprising:
   receiving an indication of NR usage by a user equipment (UE), wherein the indication of NR usage includes an indication of NR as a radio access type for the UE, indicating that the UE is connected to a network via an NR connection;
   determining that an application function (AF) is subscribed to receive indications of NR usage for the UE;
   in response to determining that an AF is subscribed to receive indications of NR usage for the UE, communicating the indication of NR usage to the AF;
   receiving a message from the AF with a media component description identifying at least one media component capable of using increased bandwidth provided by the NR connection; and
   modifying service provided to the UE to utilize the at least one media component capable of using the increased bandwidth by the NR connection based on the indication of NR usage.

* * * * *